C. BERCKHEMER.
Malting Vessel.
No. 64,622.
Patented May 14, 1867.
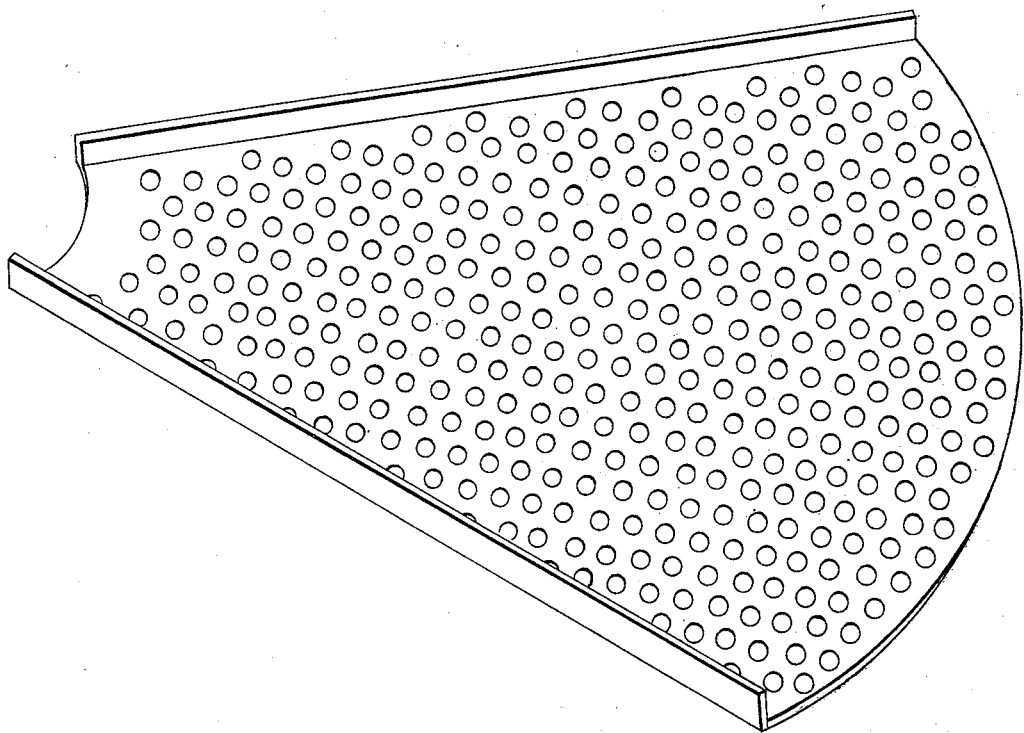
Witnesses:
Sam'l Knight
Jas. H. Layman
Inventor:
C. Berckhemer
By Knight Bros
attys.

United States Patent Office.

CHARLES BERCKHEMER, OF CINCINNATI, OHIO.

Letters Patent No. 64,622, dated May 14, 1867.

---

IMPROVEMENT IN VESSELS FOR MALTING AND BREWING.

---

The Schedule referred to in these Letters Patent and making part of the same.

---

TO ALL WHOM IT MAY CONCERN:

Be it known that I, CHARLES BERCKHEMER, of Cincinnati, Hamilton county, Ohio, have invented a new and useful Improvement in Brewing and Malting Vessels; and I do hereby declare the following to be a full, clear, and exact description thereof, reference being had to the accompanying drawing, making part of this specification.

Iron being unsuitable for the false bottoms and other necessarily metallic portions of brewers' and malters' vessels, owing to its ready oxidation, such parts are universally made at great expense of copper. I propose to afford a very much cheaper and even better substitute, by making the perforated bottoms and other plates now used in such vessels of either cast or wrought iron thoroughly coated with tin, or copper, or brass, by means of the galvanic battery. (See segment of a perforated bottom in drawing.)

I claim herein as new, and of my invention—

A perforated bottom or other metallic portion of a brewer's or malter's vessel composed of cast or wrought iron electroplated, as set forth.

In testimony of which invention I hereunto set my hand.

CHARLES BERCKHEMER.

Witnesses:
    GEO. H. KNIGHT,
    JAMES H. LAYMAN.